(12) United States Patent
Gao

(10) Patent No.: US 10,158,399 B2
(45) Date of Patent: Dec. 18, 2018

(54) SIGNAL PROCESSING METHOD AND RELATED DEVICE AND APPARATUS

(71) Applicant: Huawei Technologies Co., Ltd., Shenzhen (CN)

(72) Inventor: Xingguo Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 15/430,620

(22) Filed: Feb. 13, 2017

(65) Prior Publication Data

US 2017/0155425 A1   Jun. 1, 2017

Related U.S. Application Data

(63) Continuation of application No. PCT/CN2014/084393, filed on Aug. 14, 2014.

(51) Int. Cl.
*H04B 1/04* (2006.01)
*H04B 1/10* (2006.01)
(Continued)

(52) U.S. Cl.
CPC .......... *H04B 3/04* (2013.01); *H04L 12/2801* (2013.01); *H04L 12/40104* (2013.01); *H04N 7/10* (2013.01)

(58) Field of Classification Search
CPC .......... H04B 1/04; H04B 1/0475; H04B 1/06; H04B 1/10; H04N 7/10; H04N 7/102
See application file for complete search history.

(56) References Cited

U.S. PATENT DOCUMENTS

| 4,228,401 A | 10/1980 | Wachs et al. |
| 2005/0243938 A1 | 11/2005 | Armstrong et al. |

(Continued)

FOREIGN PATENT DOCUMENTS

| CN | 101390317 A | 3/2009 |
| CN | 102056301 A | 5/2011 |

(Continued)

OTHER PUBLICATIONS

Foreign Communication From a Counterpart Application, European Application No. 14899637.4, European Office Action dated Feb. 22, 2018, 8 pages.

(Continued)

*Primary Examiner* — Scott M Sciacca
(74) *Attorney, Agent, or Firm* — Conley Rose, P.C.

(57) ABSTRACT

A signal processing method, a related device, and an apparatus for intelligently changing a signal frequency band according to a requirement during downlink or uplink signal transmission. The disclosure includes splitting a downlink signal into a first downlink signal and a second downlink signal, where the second downlink signal is a signal defined by a preset standard, and the downlink signal is an analog signal; performing an analog-to-digital conversion on the second downlink signal to obtain a third downlink signal; filtering the third downlink signal to obtain a fourth downlink signal; performing a digital-to-analog conversion on the fourth downlink signal to obtain a fifth downlink signal; and combining the first downlink signal and the fifth downlink signal to obtain a downlink output signal.

14 Claims, 7 Drawing Sheets

(51) Int. Cl.
*H04N 7/10* (2006.01)
*H04B 3/04* (2006.01)
*H04L 12/28* (2006.01)
*H04L 12/40* (2006.01)

(56) References Cited

U.S. PATENT DOCUMENTS

| | | | | |
|---|---|---|---|---|
| 2006/0146861 | A1* | 7/2006 | Maeda | H04L 5/06 370/448 |
| 2011/0255452 | A1 | 10/2011 | Brooks | |
| 2012/0230228 | A1 | 9/2012 | Oka et al. | |
| 2013/0074138 | A1 | 3/2013 | Chapman | |
| 2013/0236182 | A1 | 9/2013 | Gong | |
| 2013/0259101 | A1* | 10/2013 | Earnshaw | H04B 3/32 375/219 |
| 2013/0276047 | A1 | 10/2013 | Chapman et al. | |
| 2014/0050212 | A1* | 2/2014 | Braz | H04J 1/08 370/343 |
| 2014/0314407 | A1* | 10/2014 | Bush | H04B 10/25751 398/45 |
| 2014/0335799 | A1* | 11/2014 | Morrison | H04B 1/525 455/78 |
| 2016/0126985 | A1* | 5/2016 | Tian | H04L 27/368 375/296 |

FOREIGN PATENT DOCUMENTS

| | | |
|---|---|---|
| CN | 202231722 U | 5/2012 |
| CN | 102594748 A | 7/2012 |
| CN | 102711151 A | 10/2012 |
| CN | 202799015 U | 3/2013 |
| CN | 103052120 A | 4/2013 |
| CN | 203537573 U | 4/2014 |
| EP | 2509223 A1 | 10/2012 |
| JP | 2009267476 A | 11/2009 |
| WO | 2011068063 A1 | 6/2011 |
| WO | WO-2014183371 A1 * | 11/2014 ........... H04L 27/368 |

OTHER PUBLICATIONS

Machine Translation and Abstract of Chinese Publication No. CN102056301, May 11, 2011, 5 pages.
Foreign Communication From a Counterpart Application, European Application No. 14899637.4, Extended European Search Report dated May 31, 2017, 10 pages.
Foreign Communication From a Counterpart Application, Chinese Application No. 201480006358.3, Chinese Office Action dated Feb. 3, 2017, 7 pages.
Foreign Communication From a Counterpart Application, PCT Application No. PCT/CN2014/084393, English Translation of International Search Report dated May 12, 2015, 2 pages.
Foreign Communication From a Counterpart Application, PCT Application No. PCT/CN2014/084393, English Translation of Written Opinion dated May 12, 2015, 7 pages.
Machine Translation and Abstract of Chinese Publication No. CN202799015, Mar. 13, 2013, 5 pages.
Machine Translation and Abstract of Chinese Publication No. CN203537573, Apr. 9, 2014, 8 pages.
Foreign Communication From a Counterpart Application, Chinese Application No. 201480006358.3, Chinese Office Action dated Aug. 29, 2017, 8 pages.

* cited by examiner

SIGNAL PROCESSING METHOD AND RELATED DEVICE AND APPARATUS

CROSS-REFERENCE TO RELATED APPLICATIONS

This application is a continuation of International Application No. PCT/CN2014/084393, filed on Aug. 14, 2014, the disclosure of which is hereby incorporated by reference in its entirety.

TECHNICAL FIELD

The present disclosure relates to the communications field, and in particular, to a signal processing method, a related device, and an apparatus.

BACKGROUND

In the communications field, to exchange a message, every device needs to send a signal. A signal is a tool for carrying a message, is a carrier of a message, and is a physical quantity or a pulse (such as a voltage, a current, or magnetic field strength) that can be perceived. Information or a message can be transmitted by using the signal.

People want to experience more and require a signal transmission speed to be as high as possible. Theoretically, provided that a medium carrying and transmitting a signal is increasingly wide, more signals are transmitted in one-off transmission, and therefore the speed is increasingly high. However, because of physical reasons such as a level and because people can only process a limited pulse fluctuation frequency in the prior art, in the current cable field, a frequency division multiplexing technology is basically used to separate a downlink frequency band and an uplink frequency band that are used to transmit a signal. For example, in a previous Data Over Cable Service Interface Specifications (DOCSIS) 3.0 standard, a U.S.-standard definition is uplink signal (US): 5 MHz to 42 MHz and downlink signal (DS): 57 MHz to 1002 MHz, and a European-standard definition is US: 5 MHz to 65 MHz and DS: 87 MHz to 1002 MHz. In the current latest DOCSIS 3.1 technology, uplink and downlink spectra are re-divided: US: 5 MHz to 204 MHz and DS: 258 MHz to 1200 MHz. A pulse fluctuation frequency that can be processed cannot be easily changed. Therefore, how to properly and flexibly split an uplink signal and a downlink signal becomes another manner for resolving the problem by people.

In the prior art, one device only supports one frequency mixing specification, for example, 42 MHz/55 MHz. If a frequency band needs to be re-divided subsequently, the original frequency mixing specification needs to be replaced by a new frequency mixing specification on the device site, for example, 65 MHz/87 MHz, or 87 MHz/108 MHz, or 204 MHz/258 MHz. In this way, a signal frequency band needs to be changed by means of manual setting, which is not intelligent, is not flexible, and consumes plenty of resources.

SUMMARY

Embodiments of the present disclosure provide a signal processing method, a related device, and an apparatus, so as to intelligently change a signal frequency band according to a requirement during downlink or uplink signal transmission.

A first aspect of the present disclosure provides a downlink signal processing method, including splitting a downlink signal into a first downlink signal and a second downlink signal, where the second downlink signal is a signal defined by a preset standard, and the downlink signal is an analog signal; performing an analog-to-digital conversion on the second downlink signal to obtain a third downlink signal; filtering the third downlink signal to obtain a fourth downlink signal; performing a digital-to-analog conversion on the fourth downlink signal to obtain a fifth downlink signal; and combining the first downlink signal and the fifth downlink signal to obtain a downlink output signal.

With reference to the first aspect of the embodiments of the present disclosure, in a first implementation manner of the first aspect of the embodiments of the present disclosure, the filtering the third downlink signal includes filtering the third downlink signal according to a standard downlink signal filtering rule defined by DOCSIS.

With reference to the first aspect of the embodiments of the present disclosure, in a second implementation manner of the first aspect of the embodiments of the present disclosure, the second downlink signal is a signal having a maximum standard downlink signal fluctuation frequency defined by DOCSIS.

With reference to the first aspect of the embodiments of the present disclosure, in a third implementation manner of the first aspect of the embodiments of the present disclosure, before the combining the first downlink signal and the fifth downlink signal to obtain a downlink output signal, the method further includes adjusting the first downlink signal to a level signal that can be input.

With reference to the first aspect of the embodiments of the present disclosure, in a fourth implementation manner of the first aspect of the embodiments of the present disclosure, after the combining the first downlink signal and the fifth downlink signal to obtain a downlink output signal, the method further includes amplifying and sending the downlink output signal.

A second aspect of the present disclosure provides a filter device, including a downlink splitting unit, configured to split a downlink signal into a first downlink signal and a second downlink signal, so that the second downlink signal is a signal meeting a preset standard; a downlink first conversion unit, configured to convert the second downlink signal into a digital signal to obtain a third downlink signal; a downlink filter unit, configured to filter the third downlink signal to obtain a fourth downlink signal; a downlink second conversion unit, configured to convert the fourth downlink signal into an analog signal to obtain a fifth downlink signal; and a downlink combining unit, configured to combine the first downlink signal and the fifth downlink signal to obtain a downlink output signal.

With reference to the second aspect of the embodiments of the present disclosure, in a first implementation manner of the second aspect of the embodiments of the present disclosure, the filter device further includes a downlink adjustment unit, configured to: before the downlink combining unit combines the first downlink signal and the fifth downlink signal to obtain the downlink output signal, adjust the first downlink signal to a level signal that can be input.

With reference to the second aspect of the embodiments of the present disclosure, in a second implementation manner of the second aspect of the embodiments of the present disclosure, the filter device further includes a downlink amplifier unit, configured to amplify the downlink output signal.

With reference to the second aspect of the embodiments of the present disclosure, in a third implementation manner of the second aspect of the embodiments of the present disclosure, the filter device further includes a downlink sending unit, configured to send the downlink output signal.

A third aspect of the present disclosure provides an uplink signal processing method, including performing an analog-to-digital conversion on a first uplink signal to obtain a second uplink signal, where the first uplink signal is an analog signal; filtering the second uplink signal to obtain a third uplink signal; and performing a digital-to-analog conversion on the third uplink signal to obtain an uplink output signal.

With reference to the third aspect of the embodiments of the present disclosure, in a first implementation manner of the third aspect of the embodiments of the present disclosure, the filtering the second uplink signal includes filtering the second uplink signal according to a standard uplink signal filtering rule defined by DOCSIS.

With reference to the third aspect of the embodiments of the present disclosure, in a second implementation manner of the third aspect of the embodiments of the present disclosure, before the performing an analog-to-digital conversion on a first uplink signal, the method further includes filtering the first uplink signal, so that a fluctuation frequency of the first uplink signal meets a maximum standard uplink signal fluctuation frequency defined by DOCSIS.

With reference to the third aspect of the embodiments of the present disclosure, in a third implementation manner of the third aspect of the embodiments of the present disclosure, after the performing a digital-to-analog conversion on the third uplink signal to obtain an uplink output signal, the method further includes amplifying and sending the uplink output signal.

A fourth aspect of the present disclosure provides a second filter device, including an uplink first conversion unit, configured to convert a first uplink signal into a digital signal to obtain a second uplink signal; an uplink second filter unit, configured to filter the second uplink signal to obtain a third uplink signal; and an uplink second conversion unit, configured to convert the third uplink signal into an analog signal to obtain an uplink output signal.

With reference to the fourth aspect of the embodiments of the present disclosure, in a first implementation manner of the fourth aspect of the embodiments of the present disclosure, the filter device further includes an uplink first filter unit, configured to filter the first uplink signal, so that a fluctuation frequency of the first uplink signal meets a maximum standard uplink signal fluctuation frequency defined by DOCSIS.

With reference to the fourth aspect of the embodiments of the present disclosure, in a second implementation manner of the fourth aspect of the embodiments of the present disclosure, the filter device further includes an uplink amplifier unit, configured to amplify the uplink output signal.

With reference to the fourth aspect of the embodiments of the present disclosure, in a third implementation manner of the fourth aspect of the embodiments of the present disclosure, the filter device further includes an uplink sending unit, configured to send the uplink output signal.

A fifth aspect of the present disclosure provides a signal filtering apparatus, including the device according to any one of the second aspect or all implementation manners of the second aspect of the embodiments of the present disclosure and the device according to any one of the fourth aspect or all implementation manners of the fourth aspect of the embodiments of the present disclosure; and a control unit, configured to set filtering rules of the downlink filter unit and the uplink second filter unit, so that the downlink filter unit and the uplink second filter unit perform filtering according to a requirement.

In the embodiments of the present disclosure, when a downlink signal is being processed, the downlink signal is split into a first downlink signal and a second downlink signal, where the second downlink signal is a signal defined by a preset standard, and the downlink signal is an analog signal; an analog-to-digital conversion is performed on the second downlink signal to obtain a third downlink signal; the third downlink signal is filtered to obtain a fourth downlink signal; a digital-to-analog conversion is performed on the fourth downlink signal to obtain a fifth downlink signal; and the first downlink signal and the fifth downlink signal are combined to obtain a downlink output signal. The embodiments of the present disclosure further disclose an uplink signal processing method, a related device, and an apparatus. In the present disclosure, frequency bands of downlink and uplink signals are filtered according to a requirement of a user end, thereby implementing an intelligent frequency band change and improving frequency band utilization and flexibility.

DESCRIPTION OF EMBODIMENTS

Embodiments of the present disclosure provide a signal processing method, a related device, and an apparatus, so as to intelligently change a signal frequency band according to a requirement during downlink or uplink signal transmission.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

Figure 1:
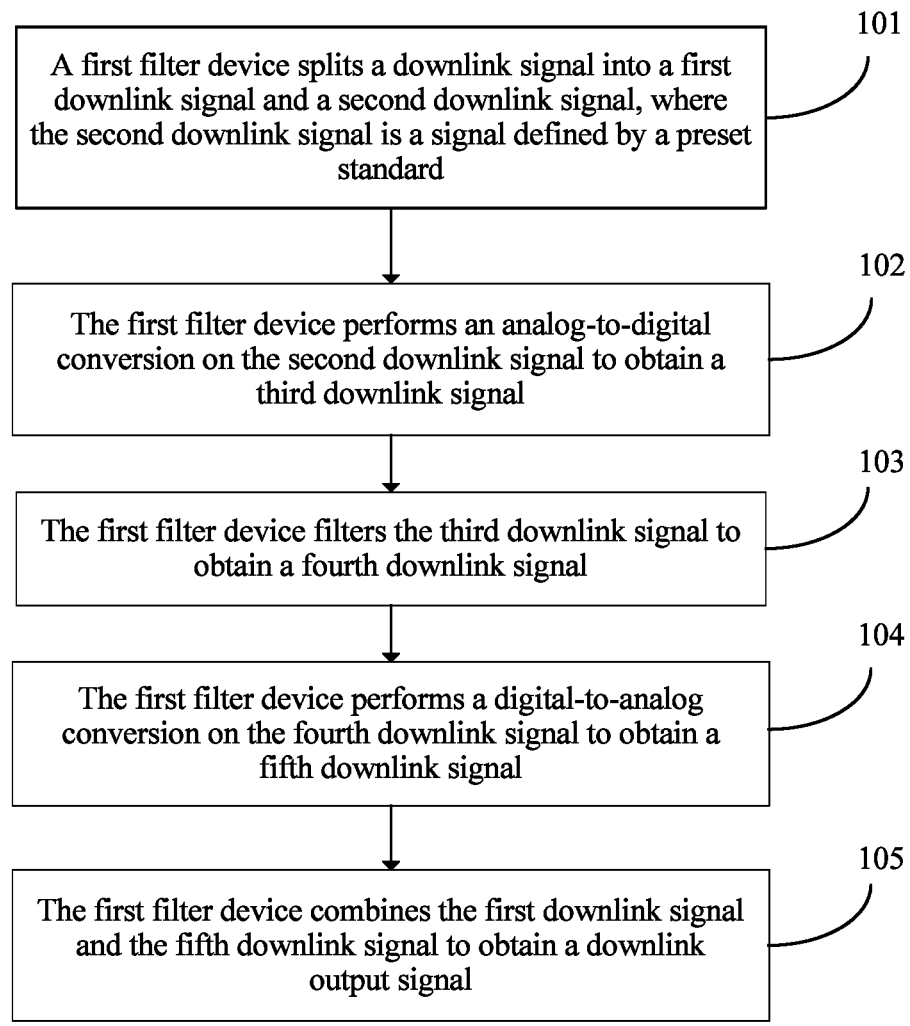
FIG. 1 is a schematic diagram of an embodiment of a downlink signal processing method according to an embodiment of the present disclosure.

Referring to FIG. 1, an embodiment of a downlink signal processing method according to an embodiment of the present disclosure includes the following steps.

101. A first filter device splits a downlink signal into a first downlink signal and a second downlink signal according to a preset rule, where the second downlink signal is a signal defined by a preset standard.

Because a signal that has a maximum fluctuation frequency and can be actually processed is excessively less than a signal transmitted in a physical medium, the first filter device needs to first split a received transmit signal to obtain a second downlink signal that can be processed.

102. The first filter device performs an analog-to-digital conversion on the second downlink signal to obtain a third downlink signal.

A signal that can be processed inside a processor is a digital signal. However, the downlink signal is an analog signal, and the second downlink signal obtained by splitting is also an analog signal. Therefore, before signal processing, an analog signal needs to be first converted into a digital signal.

103. The first filter device filters the third downlink signal to obtain a fourth downlink signal.

The fourth downlink signal obtained by filtering is a signal that is in a frequency band required by a user or a signal that is in a proper frequency band required by a terminal. The required frequency band may be preset manually, or may be intelligently changed according to an actual condition of a network; and may be any frequency band that can be implemented.

104. The first filter device performs a digital-to-analog conversion on the fourth downlink signal to obtain a fifth downlink signal.

A processed digital signal needs to be used to drive another device, and therefore the digital signal needs to be converted into an analog signal.

105. The first filter device combines the first downlink signal and the fifth downlink signal to obtain a downlink output signal.

For normal output of the fifth downlink signal, the first downlink signal and the fifth downlink signal need to be combined to reach a standard fluctuation frequency that is normally output.

In this embodiment of the present disclosure, a first filter device filters a downlink signal, so that a filtered downlink signal is a signal meeting a preset requirement. In this way, a user may freely filter a downlink signal according to a requirement, thereby implementing an intelligent frequency band change and improving frequency band utilization and flexibility.

Figure 2:
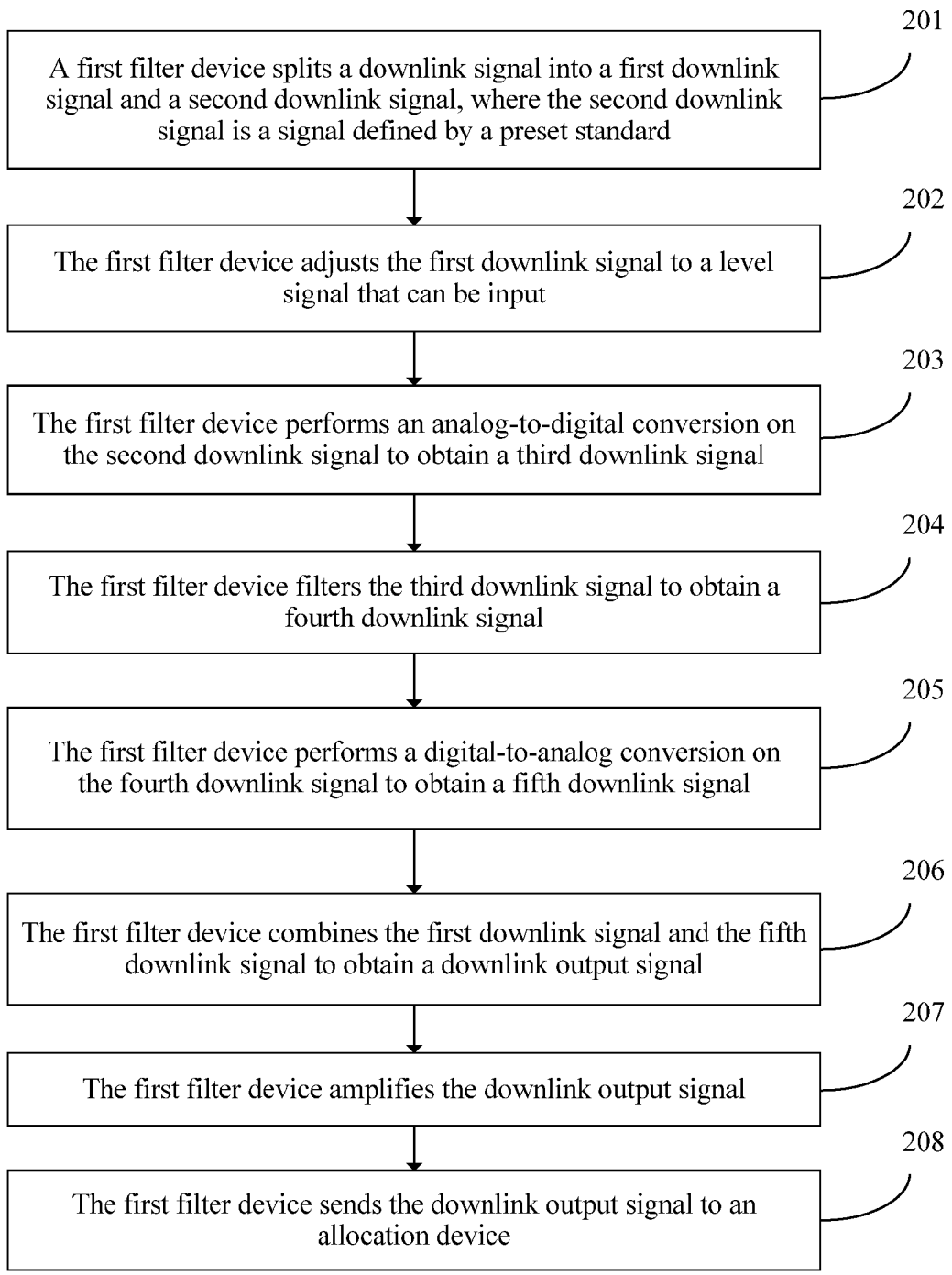
FIG. 2 is a schematic diagram of another embodiment of a downlink signal processing method according to an embodiment of the present disclosure.

In the foregoing embodiment, processing and output of a second downlink signal are described. In an actual application, processing of a first downlink signal and processing of an output signal obtained by combining are also included. The following specifically describes a specific rule or standard, a manner for processing the first downlink signal by a first filter device, and a manner for processing the output signal obtained by combining. Referring to FIG. 2, another embodiment of a downlink signal processing method in the present disclosure includes the following steps.

201. A first filter device splits a downlink signal into a first downlink signal and a second downlink signal, where the second downlink signal is a signal defined by a preset standard.

Theoretically, a fluctuation frequency that a downlink signal can reach exceeds 1 GHZ. However, according to a DOCSIS standard, a maximum downlink signal fluctuation frequency that can be actually processed is 204 MHz or 258 MHz. Therefore, the downlink signal needs to be first split to obtain a second downlink signal that has a maximum fluctuation frequency and can be processed. It should also be noted that because the prior art is limited, a signal fluctuation frequency that can be processed is 204 MHz or 258 MHz, and if there is an update in a new technology, the signal fluctuation frequency that can be processed becomes greater or another signal fluctuation frequency standard appears, which still falls within the protection scope of the present disclosure, and is not limited herein.

202. The first filter device adjusts the first downlink signal to a level signal that can be input.

To make a final level signal stronger, the first downlink signal may be first input into an amplifier for amplification. Before this, a level value of the first downlink signal needs to be adjusted, so that the first downlink signal is a level signal that can be input.

203. The first filter device performs an analog-to-digital conversion on the second downlink signal to obtain a third downlink signal.

A signal that can be processed inside a processor is a digital signal. However, the downlink signal is an analog signal, and the second downlink signal obtained by splitting is also an analog signal. Therefore, before signal processing, an analog signal needs to be first converted into a digital signal.

204. The first filter device filters the third downlink signal to obtain a fourth downlink signal.

The first filter device filters the third downlink signal according to a preset requirement, and the obtained fourth downlink signal is a signal that is in a frequency band required by a user or a signal that is in a most proper frequency band of a terminal. The required frequency band may be preset manually, or may be intelligently changed according to an actual condition of a network; and may be any frequency band that can be implemented. The first filter device filters the third downlink signal according to a standard downlink signal filtering rule defined by DOCSIS, so as to obtain a downlink signal frequency band required by the user. The preset frequency band may be any frequency band that is in all DOCSIS and that can be implemented, for example, 65 MHz to 204 MHz, or 87 MHz to 204 MHz, or 108 MHz to 204 MHz.

205. The first filter device performs a digital-to-analog conversion on the fourth downlink signal to obtain a fifth downlink signal.

A processed digital signal needs to be used to drive another device, and therefore the digital signal needs to be converted into an analog signal.

206. The first filter device combines the first downlink signal and the fifth downlink signal to obtain a downlink output signal.

For normal output of the fifth downlink signal, the first downlink signal and the fifth downlink signal need to be combined to reach a standard fluctuation frequency that is normally output.

207. The first filter device amplifies the downlink output signal.

To make an output signal stronger, the downlink output signal may be amplified before being output.

208. The first filter device sends the downlink output signal to an allocation device.

A complete downlink output signal obtained after processing is sent to the allocation device, and the allocation device can perform processing such as allocation on the received signal.

In this embodiment of the present disclosure, the description includes a manner for processing a first downlink signal and a manner for processing a downlink output signal, and includes adjustment of a level value of the first downlink signal and amplification of the downlink output signal. In this way, the downlink output signal is stronger and more secure.

Figure 3:
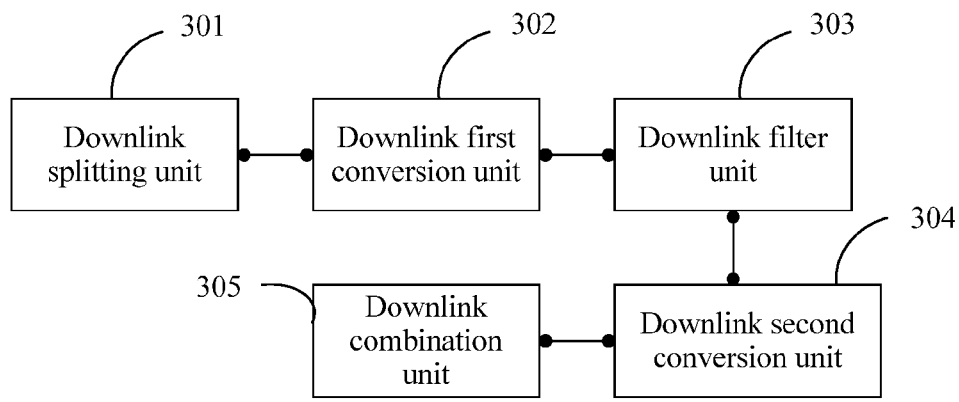
FIG. 3 is a schematic diagram of an embodiment of a filter device according to an embodiment of the present disclosure.

Referring to FIG. 3, an embodiment of a first filter device according to an embodiment of the present disclosure includes a downlink splitting unit 301, a downlink first conversion unit 302, a downlink filter unit 303, a downlink second conversion unit 304, and a downlink combining unit 305.

The downlink splitting unit 301 is configured to split a downlink signal into a first downlink signal and a second downlink signal, so that the second downlink signal is a signal meeting a preset standard.

Because a signal that has a maximum fluctuation frequency and can be actually processed is excessively less than a signal transmitted in a physical medium, the first filter device needs to first split a received transmit signal to obtain a second downlink signal that can be processed.

The downlink first conversion unit 302 is configured to convert the second downlink signal into a digital signal to obtain a third downlink signal.

A signal that can be processed inside a processor is a digital signal. However, the downlink signal is an analog signal, and the second downlink signal obtained by splitting is also an analog signal. Therefore, before signal processing, an analog signal needs to be first converted into a digital signal.

The downlink filter unit 303 is configured to filter the third downlink signal to obtain a fourth downlink signal.

The downlink filter unit 303 filters the third downlink signal according to a preset requirement, and the obtained fourth downlink signal is a signal that is in a frequency band required by a user or a signal that is in a most proper frequency band of a terminal. The required frequency band may be preset manually, or may be intelligently changed according to an actual condition of a network; and may be any frequency band that can be implemented.

The downlink second conversion unit 304 is configured to convert the fourth downlink signal into an analog signal to obtain a fifth downlink signal.

A processed digital signal needs to be used to drive another device, and therefore the digital signal needs to be converted into an analog signal.

The downlink combining unit 305 is configured to combine the first downlink signal and the fifth downlink signal to obtain a downlink output signal.

For normal output of the fifth downlink signal, the first downlink signal and the fifth downlink signal need to be combined to reach a standard fluctuation frequency that is normally output.

In this embodiment of the present disclosure, a downlink filter unit filters a third downlink signal to obtain a fourth downlink signal meeting a preset frequency band requirement. In this way, a user may freely filter a downlink signal according to a requirement, thereby implementing an intelligent frequency band change and improving frequency band utilization and flexibility.

Figure 4:
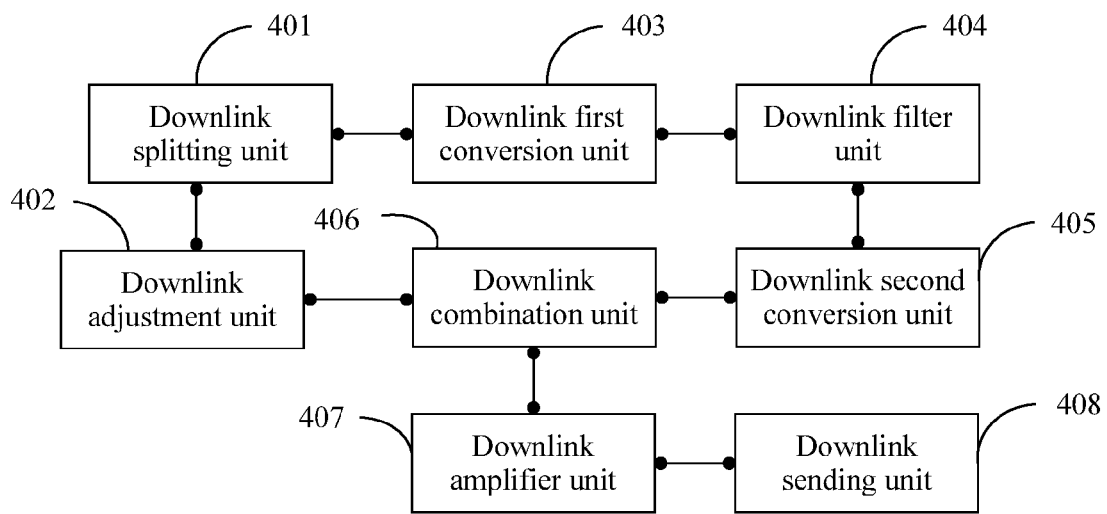
FIG. 4 is a schematic diagram of another embodiment of a filter device according to an embodiment of the present disclosure.

In the foregoing embodiment, processing and output of a second downlink signal by the first filter device are described. In an actual application, a unit for processing a first downlink signal and units for processing and sending an output signal obtained by combining are also included. The following specifically describes processing of the first downlink signal by the first filter device and the units for processing and sending the output signal obtained by combining. Referring to FIG. 4, another embodiment of a first filter device in the present disclosure includes a downlink splitting unit 401, a downlink adjustment unit 402, a downlink first conversion unit 403, a downlink filter unit 404, a downlink second conversion unit 405, a downlink combining unit 406, a downlink amplifier unit 407, and a downlink sending unit 408.

The downlink splitting unit 401 is configured to split a downlink signal into a first downlink signal and a second downlink signal according to a preset first rule, so that the second downlink signal is a signal meeting a preset standard.

Theoretically, a fluctuation frequency that a downlink signal can reach exceeds 1 GHZ. However, according to a DOCSIS standard, a maximum downlink signal fluctuation frequency that can be actually processed is 204 MHz or 258 MHz. Therefore, the downlink signal needs to be first split to obtain a second downlink signal that has a maximum fluctuation frequency and can be processed. It should also be noted that because the prior art is limited, a signal fluctuation frequency that can be processed is 204 MHz or 258 MHz, and if there is an update in a new technology, the signal fluctuation frequency that can be processed becomes greater or another signal fluctuation frequency standard appears, which still falls within the protection scope of the present disclosure, and is not limited herein.

The downlink adjustment unit 402 is configured to: before the first downlink signal and the fifth downlink signal are combined to obtain the downlink output signal, adjust the first downlink signal to a level signal that can be input.

To make a final level signal stronger, the first downlink signal may be first input into an amplifier for amplification. Before this, a level value of the first downlink signal needs to be adjusted, so that the first downlink signal is a level signal that can be input.

The downlink first conversion unit 403 is configured to convert the second downlink signal into a digital signal to obtain a third downlink signal.

A signal that can be processed inside a processor is a digital signal. However, the downlink signal is an analog signal, and the second downlink signal obtained by splitting is also an analog signal. Therefore, before signal processing, an analog signal needs to be first converted into a digital signal.

The downlink filter unit 404 is configured to filter the third downlink signal to obtain a fourth downlink signal.

The third downlink signal is filtered according to a preset requirement, and the obtained fourth downlink signal is a signal that is in a frequency band required by a user or a signal that is in a most proper frequency band of a terminal. The required frequency band may be preset manually, or may be intelligently changed according to an actual condition of a network; and may be any frequency band that can be implemented. The third downlink signal is filtered according to a standard downlink signal filtering rule defined by DOCSIS, so as to obtain a downlink signal frequency band required by the user. The preset frequency band may be any frequency band that is in all DOCSIS and that can be implemented, for example, 65 MHz to 204 MHz, or 87 MHz to 204 MHz, or 108 MHz to 204 MHz.

The downlink second conversion unit 405 is configured to convert the fourth downlink signal into an analog signal to obtain a fifth downlink signal.

A processed digital signal needs to be used to drive another device, and therefore the digital signal needs to be converted into an analog signal.

The downlink combining unit 406 is configured to combine the first downlink signal and the fifth downlink signal to obtain a downlink output signal.

For normal output of the fifth downlink signal, the first downlink signal and the fifth downlink signal need to be combined to reach a standard fluctuation frequency that is normally output.

The downlink amplifier unit 407 is configured to amplify the downlink output signal.

To make an output signal stronger, the downlink output signal may be amplified before being output, so as to obtain a radio frequency signal.

The downlink sending unit 408 is configured to send the downlink output signal to an allocation device.

A complete downlink output signal obtained after processing is sent to the allocation device, and the allocation device can perform processing such as allocation on the received signal.

In this embodiment of the present disclosure, the description includes a unit for processing a first downlink signal and a unit for processing a downlink output signal, and includes a downlink adjustment unit for adjusting a level value of the first downlink signal and a downlink amplifier unit for amplifying the downlink output signal. In this way, the downlink output signal is stronger and more secure.

Figure 5:
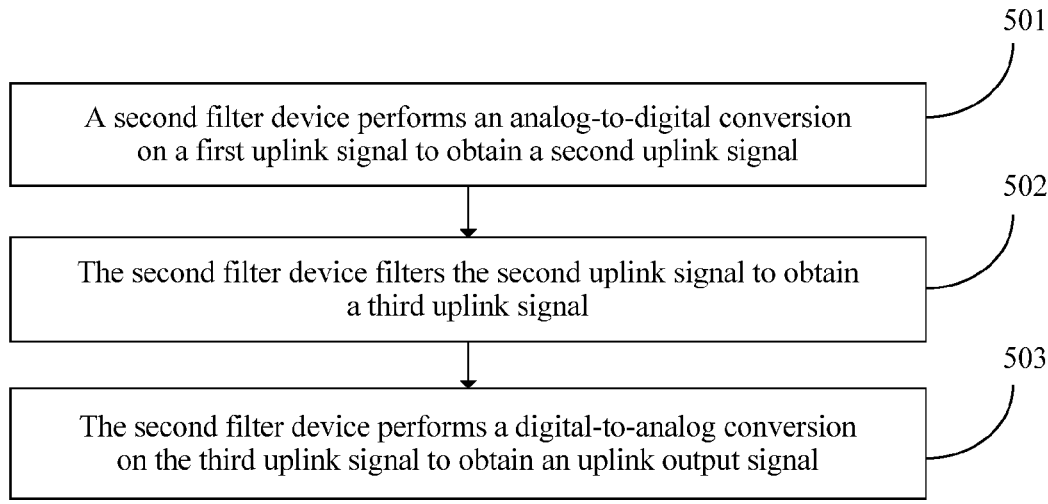
FIG. 5 is a schematic diagram of an embodiment of an uplink signal processing method according to an embodiment of the present disclosure.

Referring to FIG. 5, an embodiment of an uplink signal processing method according to an embodiment of the present disclosure includes the following steps.

501. A second filter device performs an analog-to-digital conversion on a first uplink signal to obtain a second uplink signal.

The first uplink signal transmitted from an allocation device is an analog signal, but a signal that can be actually processed by a processor is a digital signal. Therefore, the analog signal needs to be first converted into a digital signal.

502. The second filter device filters the second uplink signal to obtain a third uplink signal.

The second filter device filters the second uplink signal according to a preset requirement, and the obtained third uplink signal is a signal that is in a frequency band required by a user or a signal that is in a most proper frequency band of a terminal. The required frequency band may be preset manually, or may be intelligently changed according to an actual condition of a network; and may be any frequency band that can be implemented.

503. The second filter device performs a digital-to-analog conversion on the third uplink signal to obtain an uplink output signal.

A processed digital signal needs to be used to drive another device, and therefore the digital signal needs to be converted into an analog signal.

In this embodiment of the present disclosure, a second filter device filters a second uplink signal to obtain a third uplink signal meeting a preset frequency band requirement. In this way, a user may freely filter an uplink signal according to a requirement, thereby implementing an intelligent frequency band change and improving frequency band utilization and flexibility.

Figure 6:
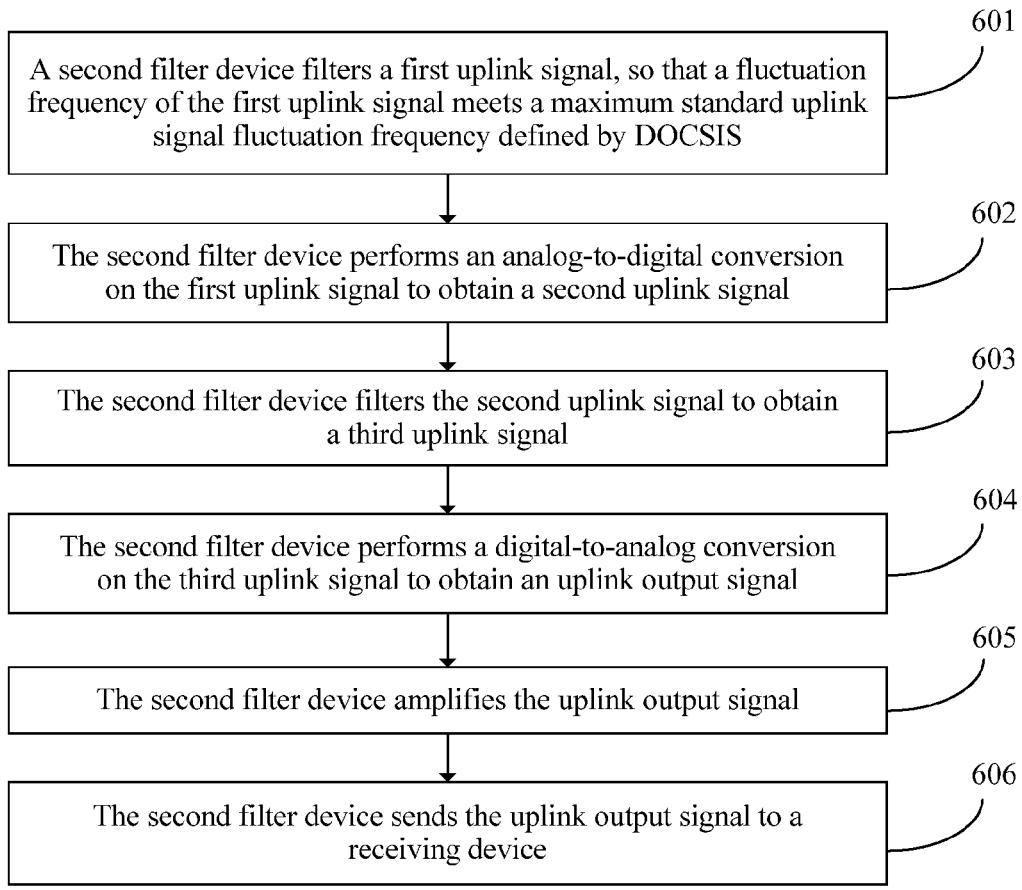
FIG. 6 is a schematic diagram of another embodiment of an uplink signal processing method according to an embodiment of the present disclosure.

In the foregoing embodiment, conversion and filtering processing of an uplink signal are described. In an actual application, a manner for filtering the uplink signal before conversion and manners for amplifying and sending the uplink signal are also included. The following specifically describes the manner for filtering the uplink signal before conversion and the manners for amplifying and sending the uplink signal. Referring to FIG. 6, another embodiment of an uplink signal processing method in the present disclosure includes the following steps.

601. A second filter device filters a first uplink signal, so that a fluctuation frequency of the first uplink signal meets a maximum standard uplink signal fluctuation frequency defined by DOCSIS.

According to a DOCSIS standard, a maximum uplink signal fluctuation frequency that can be actually processed is 204 MHz or 258 MHz. However, a received uplink signal includes an entire frequency band range that is excessively greater than the uplink signal frequency band that can be processed. Therefore, the uplink signal needs to be first split to obtain a second uplink signal that has a maximum fluctuation frequency and can be processed. It should also be noted that because the prior art is limited, a signal fluctuation frequency that can be processed is 204 MHz or 258 MHz, and if there is an update in a new technology, the signal fluctuation frequency that can be processed becomes greater or another signal fluctuation frequency standard appears, which still falls within the protection scope of the present disclosure, and is not limited herein.

602. The second filter device performs an analog-to-digital conversion on the first uplink signal to obtain a second uplink signal.

The first uplink signal transmitted from an allocation device is an analog signal, but a signal that can be actually processed by a processor is a digital signal. Therefore, the analog signal needs to be first converted into a digital signal.

603. The second filter device filters the second uplink signal to obtain a third uplink signal.

The second filter device filters the second uplink signal according to a preset requirement, and the obtained third uplink signal is a signal that is in a frequency band required by a user or a signal that is in a most proper frequency band of a terminal. The required frequency band may be preset manually, or may be intelligently changed according to an actual condition of a network; and may be any frequency band that can be implemented. The second uplink signal is filtered according to a standard uplink signal filtering rule defined by DOCSIS, so as to obtain an uplink signal frequency band required by the user. The preset frequency band may be any frequency band that is in all DOCSIS and that can be implemented, for example, 5 MHz to 52 MHz, or 5 MHz to 65 MHz, or 5 MHz to 87 MHz.

604. The second filter device performs a digital-to-analog conversion on the third uplink signal to obtain an uplink output signal.

A processed digital signal needs to be used to drive another device, and therefore the digital signal needs to be converted into an analog signal.

605. The second filter device amplifies the uplink output signal.

To make an output signal stronger, the uplink output signal may be amplified before being output, so as to obtain a radio frequency signal.

606. The second filter device sends the uplink output signal to a receiving device.

A complete uplink output signal obtained after processing is sent to the receiving device, and the receiving device can process the received signal.

In this embodiment of the present disclosure, the description includes a manner for processing a first uplink signal by a second filter device and a manner for processing an uplink output signal, and includes filtering of the first uplink signal and amplification of the uplink output signal. In this way, the uplink output signal is stronger and more secure.

Figure 7:
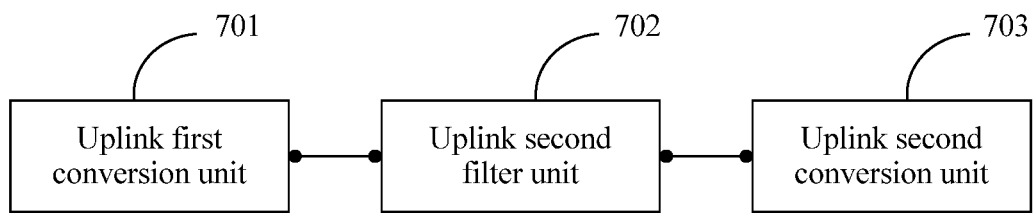
FIG. 7 is a schematic diagram of an embodiment of a filter device according to an embodiment of the present disclosure.

Referring to FIG. 7, an embodiment of a filter device according to an embodiment of the present disclosure includes an uplink first conversion unit 701, an uplink second filter unit 702, and an uplink second conversion unit 703.

The uplink first conversion unit 701 is configured to convert a first uplink signal into a digital signal to obtain a second uplink signal.

The first uplink signal transmitted from an allocation device is an analog signal, but a signal that can be actually processed by a processor is a digital signal. Therefore, the analog signal needs to be first converted into a digital signal.

The uplink second filter unit 702 is configured to filter the second uplink signal to obtain a third uplink signal.

The uplink second filter unit filters the second uplink signal according to a preset requirement, and the obtained third uplink signal is a signal that is in a frequency band required by a user. The required frequency band may be preset manually, or may be intelligently changed according to an actual condition of a network; and may be any frequency band that can be implemented.

The uplink second conversion unit 703 is configured to convert the third uplink signal into an analog signal to obtain an uplink output signal.

A processed digital signal needs to be used to drive another device, and therefore the digital signal needs to be converted into an analog signal.

In this embodiment of the present disclosure, an uplink filter unit filters a second uplink signal to obtain a third uplink signal meeting a preset frequency band requirement. In this way, a user may freely filter an uplink signal according to a requirement, thereby implementing an intelligent frequency band change and improving frequency band utilization and flexibility.

Figure 8:
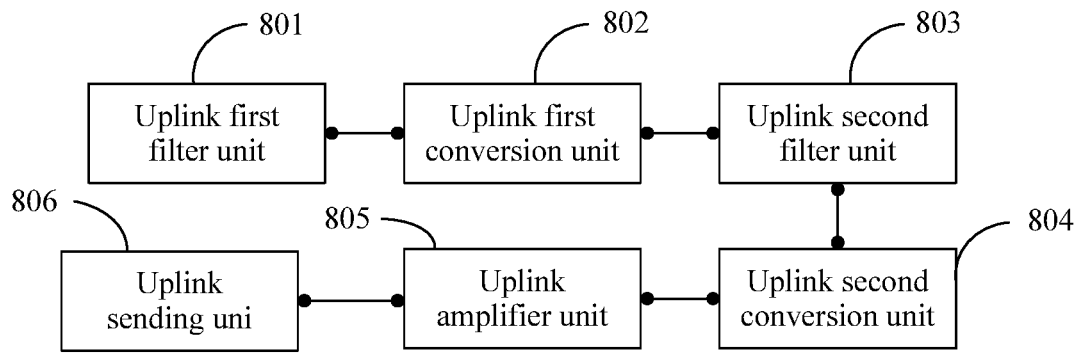
FIG. 8 is a schematic diagram of another embodiment of a filter device according to an embodiment of the present disclosure.

In the foregoing embodiment, conversion and filtering processing of an uplink signal are described. In an actual application, a unit for filtering the uplink signal before conversion and units for amplifying and sending the uplink signal are also included. The following specifically describes the unit for filtering the uplink signal before conversion and the units for amplifying and sending the uplink signal. Referring to FIG. 8, another embodiment of a filter device in the present disclosure includes an uplink first filter unit 801, an uplink first conversion unit 802, an uplink second filter unit 803, an uplink second conversion unit 804, an uplink amplifier unit 805, and an uplink sending unit 806.

The uplink first filter unit 801 is configured to filter a first uplink signal, so that a fluctuation frequency of the first uplink signal meets a maximum standard uplink signal fluctuation frequency defined by DOCSIS.

According to a DOCSIS standard, a maximum uplink signal fluctuation frequency that can be actually processed is 204 MHz or 258 MHz. However, a received uplink signal includes an entire frequency band range that is excessively greater than the uplink signal frequency band that can be processed. Therefore, the uplink signal needs to be first split to obtain a second uplink signal that has a maximum fluctuation frequency and can be processed. It should also be noted that because the prior art is limited, a signal fluctuation frequency that can be processed is 204 MHz or 258 MHz, and if there is an update in a new technology, the signal fluctuation frequency that can be processed becomes greater or another signal fluctuation frequency standard appears, which still falls within the protection scope of the present disclosure, and is not limited herein.

The uplink first conversion unit 802 is configured to convert the first uplink signal into a digital signal to obtain a second uplink signal.

The first uplink signal transmitted from an allocation device is an analog signal, but a signal that can be actually processed by a processor is a digital signal. Therefore, the analog signal needs to be first converted into a digital signal.

The uplink second filter unit 803 is configured to filter the second uplink signal to obtain a third uplink signal.

The uplink second filter unit 803 filters the second uplink signal according to a preset requirement, and the obtained third uplink signal is a signal that is in a frequency band required by a user or a signal that is in a most proper frequency band of a terminal. The required frequency band may be preset manually, or may be intelligently changed according to an actual condition of a network; and may be any frequency band that can be implemented. The second uplink signal is filtered according to a standard uplink signal filtering rule defined by DOCSIS, so as to obtain an uplink signal frequency band required by the user. The preset frequency band may be any frequency band that is in all DOCSIS and that can be implemented, for example, 5 MHz to 52 MHz, or 5 MHz to 65 MHz, or 5 MHz to 87 MHz.

The uplink second conversion unit 804 is configured to convert the third uplink signal into an analog signal to obtain an uplink output signal.

A processed digital signal needs to be used to drive another device, and therefore the digital signal needs to be converted into an analog signal.

The uplink amplifier unit 805 is configured to amplify the uplink output signal.

To make an output signal stronger, the uplink output signal may be amplified before being output, so as to obtain a radio frequency signal.

The uplink sending unit 806 is configured to send the uplink output signal to a receiving device.

A complete uplink output signal obtained after processing is sent to the receiving device, and the receiving device can process the received signal.

In this embodiment of the present disclosure, the description includes a unit for processing a first uplink signal and a unit for processing an uplink output signal that are of a second filter device, and includes filtering of the first uplink signal and amplification of the uplink output signal. In this way, the uplink output signal is stronger and more secure.

Figure 9:
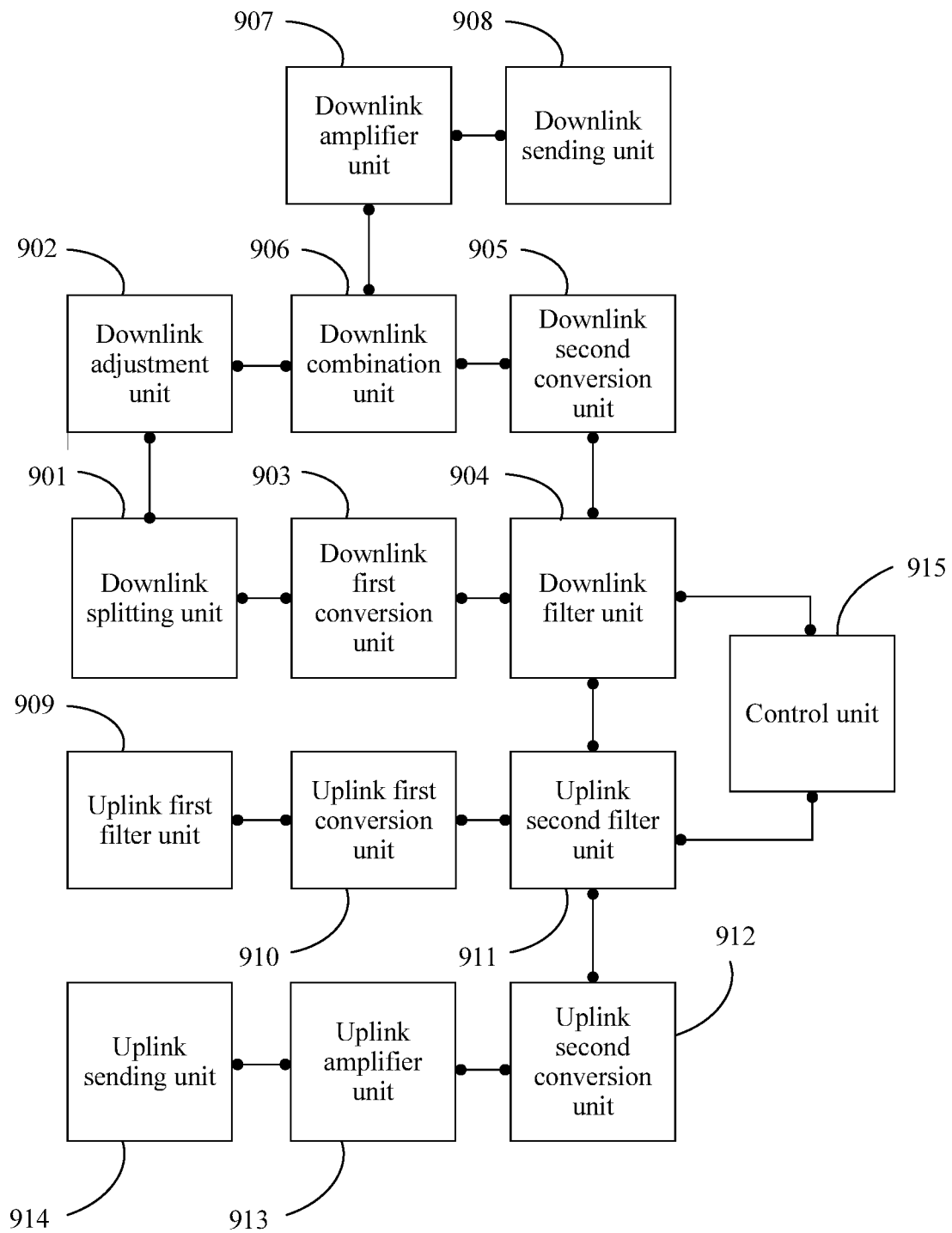
FIG. 9 is a schematic diagram of an embodiment of a signal filtering apparatus according to an embodiment of the present disclosure.

Referring to FIG. 9, an embodiment of a signal filtering apparatus according to an embodiment of the present disclosure includes a downlink splitting unit 901, a downlink adjustment unit 902, a downlink first conversion unit 903, a downlink filter unit 904, a downlink second conversion unit 905, a downlink combining unit 906, a downlink amplifier unit 907, a downlink sending unit 908, an uplink first filter unit 909, an uplink first conversion unit 910, an uplink second filter unit 911, an uplink second conversion unit 912, an uplink amplifier unit 913, an uplink sending unit 914, and a control unit 915.

The downlink splitting unit 901 is configured to split a downlink signal into a first downlink signal and a second downlink signal, so that the second downlink signal is a signal meeting a preset standard.

Theoretically, a fluctuation frequency that a downlink signal can reach exceeds 1 GHZ. However, according to a DOCSIS standard, a maximum downlink signal fluctuation frequency that can be actually processed is 204 MHz or 258 MHz. Therefore, the downlink signal needs to be first split to obtain a second downlink signal that has a maximum fluctuation frequency and can be processed. It should also be noted that because the prior art is limited, a signal fluctuation frequency that can be processed is 204 MHz or 258 MHz, and if there is an update in a new technology, the signal fluctuation frequency that can be processed becomes greater or another signal fluctuation frequency standard appears, which still falls within the protection scope of the present disclosure, and is not limited herein.

The downlink adjustment unit 902 is configured to: before the first downlink signal and a fifth downlink signal are combined to obtain a downlink output signal, adjust the first downlink signal to a level signal that can be input.

To make a final level signal stronger, the first downlink signal may be first input into an amplifier for amplification. Before this, a level value of the first downlink signal needs to be adjusted, so that the first downlink signal is a level signal that can be input.

The downlink first conversion unit 903 is configured to convert the second downlink signal into a digital signal to obtain a third downlink signal.

A signal that can be processed inside a processor is a digital signal. However, the downlink signal is an analog signal, and the second downlink signal obtained by splitting is also an analog signal. Therefore, before signal processing, an analog signal needs to be first converted into a digital signal.

The downlink filter unit 904 is configured to filter the third downlink signal to obtain a fourth downlink signal.

The third downlink signal is filtered according to a standard downlink signal filtering rule defined by DOCSIS, so as to obtain a downlink signal that is in a downlink signal frequency band required by a user or in a most proper frequency band of a terminal. A preset frequency band may be any frequency band that is in all DOCSIS and that can be implemented, for example, 65 MHz to 204 MHz, or 87 MHz to 204 MHz, or 108 MHz to 204 MHz.

The downlink second conversion unit 905 is configured to convert the fourth downlink signal into an analog signal to obtain the fifth downlink signal.

A processed digital signal needs to be used to drive another device, and therefore the digital signal needs to be converted into an analog signal.

The downlink combining unit 906 is configured to combine the first downlink signal and the fifth downlink signal to obtain the downlink output signal.

For normal output of the fifth downlink signal, the first downlink signal and the fifth downlink signal need to be combined to reach a standard fluctuation frequency that is normally output.

The downlink amplifier unit 907 is configured to amplify the downlink output signal.

To make an output signal stronger, the downlink output signal may be amplified before being output, so as to obtain a radio frequency signal.

The downlink sending unit 908 is configured to send the downlink output signal to an allocation device.

A complete downlink output signal obtained after processing is sent to the allocation device, and the allocation device can perform processing such as allocation on the received signal.

The uplink first filter unit 909 is configured to filter a first uplink signal, so that a fluctuation frequency of the first uplink signal meets a maximum standard uplink signal fluctuation frequency defined by DOCSIS.

According to a DOCSIS standard, a maximum uplink signal fluctuation frequency that can be actually processed is 204 MHz or 258 MHz. However, a received uplink signal includes an entire frequency band range that is excessively greater than the uplink signal frequency band that can be processed. Therefore, the uplink signal needs to be first split to obtain a second uplink signal that has a maximum fluctuation frequency and can be processed. It should also be noted that because the prior art is limited, a signal fluctuation frequency that can be processed is 204 MHz or 258 MHz, and if there is an update in a new technology, the signal fluctuation frequency that can be processed becomes greater or another signal fluctuation frequency standard appears, which still falls within the protection scope of the present disclosure, and is not limited herein.

The uplink first conversion unit 910 is configured to convert the first uplink signal into a digital signal to obtain a second uplink signal.

The first uplink signal transmitted from an allocation device is an analog signal, but a signal that can be actually processed by a processor is a digital signal. Therefore, the analog signal needs to be first converted into a digital signal.

The uplink second filter unit 911 is configured to filter the second uplink signal to obtain a third uplink signal.

The second uplink signal is filtered according to a standard uplink signal filtering rule defined by DOCSIS, so as to obtain an uplink signal that is in a frequency band required by a user or an uplink signal that is in a most proper frequency band of a terminal. A preset frequency band may be any frequency band that is in all DOCSIS and that can be implemented, for example, 5 MHz to 52 MHz, or 5 MHz to 65 MHz, or 5 MHz to 87 MHz.

The uplink second conversion unit 912 is configured to convert the third uplink signal into an analog signal to obtain an uplink output signal.

A processed digital signal needs to be used to drive another device, and therefore the digital signal needs to be converted into an analog signal.

The uplink amplifier unit 913 is configured to amplify the uplink output signal.

To make an output signal stronger, the uplink output signal may be amplified before being output, so as to obtain a radio frequency signal.

The uplink sending unit 914 is configured to send the uplink output signal to a receiving device.

A complete uplink output signal obtained after processing is sent to the receiving device, and the receiving device can process the received signal.

The control unit 915 is configured to set filtering rules of the downlink filter unit and the uplink second filter unit, so that the downlink filter unit and the uplink second filter unit perform filtering according to a requirement.

Preset rules of the downlink filter unit and the uplink second filter unit may be manually entered into the control unit. For example, a preset rule of the downlink filter unit is manually set to 87 MHz to 204 MHz, and a preset rule of the uplink second filter unit is set to 5 MHz to 65 MHz. Alternatively, intelligent setting code may be written, so that the downlink filter unit and the uplink second filter unit perform filtering according to an actual condition. It should be noted that random and free splitting of an uplink signal or a downlink signal may be implemented in the present disclosure. However, for no mutual interference between the uplink signal and the downlink signal, frequency bands of the downlink signal and the uplink signal are generally set to be different.

Figure 10:
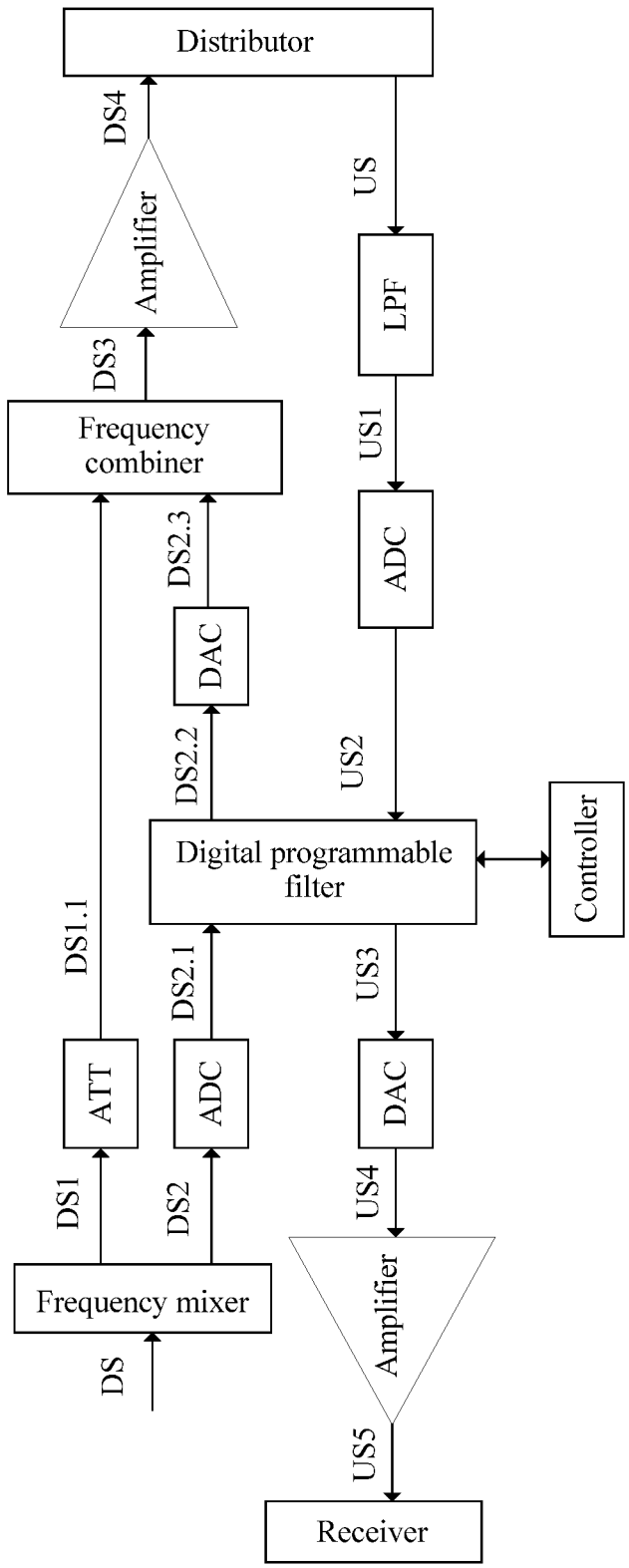
FIG. 10 is a schematic diagram of an embodiment of an application scenario according to an embodiment of the present disclosure.

In conclusion, all the embodiments are separate method embodiments or device or apparatus embodiments. For more intuitive presentation of the present disclosure, the following specifically describes technical solutions of the present disclosure by using an example of processing a downlink signal and processing an uplink signal, as shown in FIG. 10.

Downlink Signal:

Step 1: A downlink signal DS passes through a frequency mixer and is split into a DS1 and a DS2 according to a maximum frequency fluctuation standard defined by DOCIS 3.1, where a frequency band of the DS2 is 0 MHz to 204 MHz.

Step 2: The DS1 passes through an attenuator ATT and is attenuated to a DS1.1.

Step 3: The DS2 passes through an analog-to-digital converter ADC and is converted into a digital signal DS2.1.

Step 4: The DS2.1 passes through a digital programmable filter and is filtered according to an actual requirement of a network to obtain a DS2.2 that is in a frequency band 87 MHz to 204 MHz.

Step 5: The DS2.2 passes through a digital-to-analog converter DAC and is converted into an analog signal DS2.3.

Step 6: The DS1.1 and the DS2.3 pass through a frequency combiner and are combined to obtain a DS3.

Step 7: The DS3 passes through an amplifier and is amplified to obtain a radio frequency signal DS4.

Step 8: Send the DS4 to a distributor.

Uplink Signal:

Step 1: An uplink signal US passes through a low-pass filter LPF and is filtered according to a maximum frequency fluctuation standard defined by DOCSIS 3.1 to obtain a US1, where a frequency band of the US1 is 0 MHz to 204 MHz.

Step 2: The US1 passes through an analog-to-digital converter ADC and is converted into a digital signal US2.

Step 3: The US2 passes through a digital programmable filter and is filtered according to an actual requirement of a network to obtain a US3 that is in a frequency band 5 MHz to 65 MHz.

Step 4: The US3 passes through a digital-to-analog converter DAC and is converted into an analog signal US4.

Step 5: The US4 passes through an amplifier and is amplified to obtain a radio frequency signal US5.

Step 6: Send the US5 to a receiver.

In a process of processing a downlink signal and an uplink signal, the digital programmable filter is controlled by a controller.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for downlink signal processing, the method comprising:

splitting an original downlink signal into a first downlink signal and a second downlink signal, the second downlink signal being defined by a preset standard, the second downlink signal comprising a maximum standard downlink signal fluctuation frequency defined by Data Over Cable Service Interface Specifications (DOCSIS), and the original downlink signal being an analog signal;

performing an analog-to-digital conversion on the second downlink signal to produce a third downlink signal;

filtering the third downlink signal to produce a fourth downlink signal;

performing a digital-to-analog conversion on the fourth downlink signal to produce a fifth downlink signal; and combining the first downlink signal and the fifth downlink signal to produce a downlink output signal.

2. The method of claim 1, wherein filtering the third downlink signal comprises filtering the third downlink signal according to a standard downlink signal filtering rule defined by the DOCSIS.

3. The method of claim 1, wherein before combining the first downlink signal and the fifth downlink signal, the method further comprises adjusting the first downlink signal to a level signal that can be input.

4. The method of claim 1, wherein after combining the first downlink signal and the fifth downlink signal, the method further comprises amplifying and sending the downlink output signal.

5. A filter device, the device comprising:

a memory; and a processor coupled with the memory, the processor being configured to:

split an original downlink signal into a first downlink signal and a second downlink signal, the second downlink signal meeting a preset standard, and the second downlink signal comprising a maximum standard downlink signal fluctuation frequency defined by Data Over Cable Service Interface Specifications (DOCSIS);

convert the second downlink signal into a digital signal to produce a third downlink signal;

filter the third downlink signal to produce a fourth downlink signal;

convert the fourth downlink signal into an analog signal to produce a fifth downlink signal; and combine the first downlink signal and the fifth downlink signal to produce a downlink output signal.

6. The device of claim 5, wherein the processor is further configured to:

combine the first downlink signal and the fifth downlink signal; and adjust the first downlink signal to a level signal that can be input.

7. The device of claim 5, wherein the processor is further configured to amplify the downlink output signal.

8. The device of claim 5, wherein the processor is further configured to send the downlink output signal.

9. A method for uplink signal processing, the method comprising:

filtering a first uplink signal, a fluctuation frequency of the first unlink signal meeting a maximum standard uplink signal fluctuation frequency defined by Data Over Cable Service Interface Specifications (DOCSIS);

performing an analog-to-digital conversion on the first uplink signal to produce a second uplink signal, the first uplink signal being an analog signal;

filtering the second uplink signal to produce a third uplink signal; and performing a digital-to-analog conversion on the third uplink signal to produce an uplink output signal.

10. The method of claim 9, wherein filtering the second uplink signal comprises filtering the second uplink signal according to a standard uplink signal filtering rule defined by the DOCSIS.

11. The method of claim 9, wherein after performing the digital-to-analog conversion on the third uplink signal to obtain an uplink output signal, the method further comprises amplifying aid sending the uplink output signal.

12. A filter device, comprising:
a memory; and
a processor coupled with the memory, wherein-the processor being configured to:
filter a first uplink signal, a fluctuation frequency of the first uplink signal meeting a maximum standard uplink signal fluctuation frequency defined by Data Over Cable Service Interface Specifications (DOCSIS);
convert the first uplink signal into a digital signal to produce a second uplink signal;
filter the second uplink signal to produce a third uplink signal; and
convert the third uplink signal into an analog signal to produce an uplink output signal.

13. The device of claim 12, wherein the processor is further configured to amplify the uplink output signal.

14. The device of claim 12, wherein the processor is further configured to send the uplink output signal.

* * * * *